United States Patent [19]

Armbruster et al.

[11] Patent Number: 6,131,027
[45] Date of Patent: Oct. 10, 2000

[54] SYSTEM FOR CONTROLLING NETWORK BANDWIDTH

[75] Inventors: Peter J. Armbruster; Dean Vanden Heuvel, both of Chandler, Ariz.

[73] Assignee: Motorola, Inc., Schaumburg, Ill.

[21] Appl. No.: 08/999,502

[22] Filed: Dec. 29, 1997

[51] Int. Cl.[7] .............................. H04B 7/185; H04B 7/204
[52] U.S. Cl. ........................ 455/428; 455/429; 455/12.1; 455/13.1
[58] Field of Search .................................. 455/12.1, 13.1, 455/427, 428, 429, 430, 450; 370/347, 324, 350

[56] References Cited

U.S. PATENT DOCUMENTS

| | | |
|---|---|---|
| 5,394,561 | 2/1995 | Freeburg ................................... 455/428 |
| 5,448,623 | 9/1995 | Wiedeman et al. ...................... 455/430 |
| 5,526,404 | 6/1996 | Wiedeman et al. ...................... 455/430 |
| 5,640,395 | 6/1997 | Hamalainen et al. ................... 370/322 |
| 5,717,830 | 2/1998 | Sigler et al. ............................. 455/426 |
| 5,822,310 | 10/1998 | Chennakeshu et al. ................ 370/317 |
| 5,862,478 | 1/1999 | Cutler, Jr. et al. ....................... 455/428 |

*Primary Examiner*—Daniel S. Hunter
*Assistant Examiner*—Alan T. Gantt
*Attorney, Agent, or Firm*—Harold C. McGurk; Timothy J. Lorenz

[57] ABSTRACT

In a mobile communications system (10), system (10) through base station (40) or one or more satellites (20) monitors bandwidth availability and determines acquisition channel resource information. The system (10) broadcasts the acquisition channel resource information to the mobile units (30) via satellite (20). According the acquisition channel resource information, the mobile units (30) are enabled at select time instances to access the acquisition channel, obtain a traffic channel and transmit their messages to base station (40). Thus, mobile units (30) are enabled to access system (10) when resources are available.

16 Claims, 1 Drawing Sheet

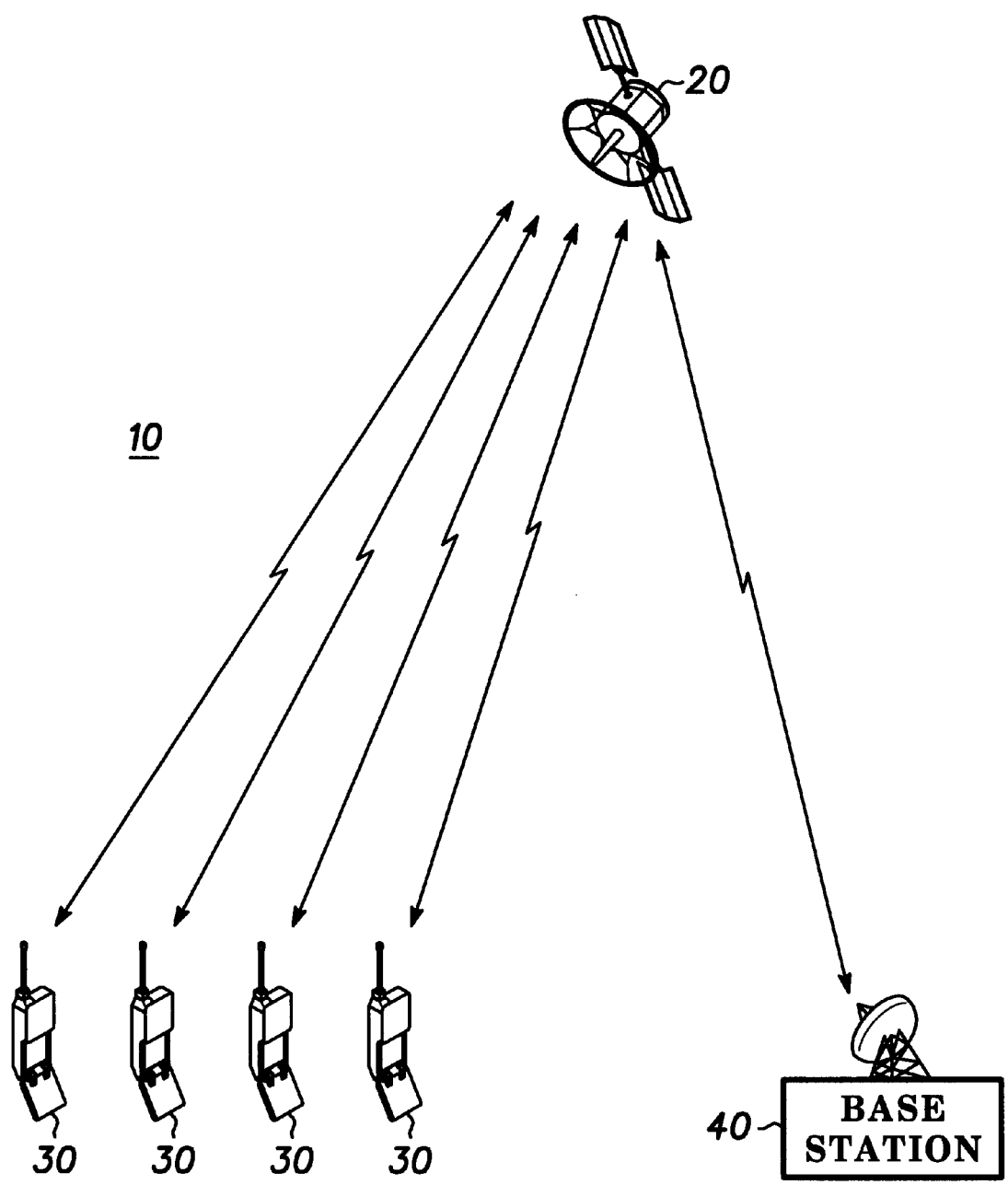

SYSTEM FOR CONTROLLING NETWORK BANDWIDTH

FIELD OF THE INVENTION

The present invention relates generally to the field of communication systems, and more specifically, to a communication system for controlling network bandwidth.

BACKGROUND OF THE INVENTION

In conventional one-way paging systems, digital messages are transmitted from a single transmission point bound for mobile selective call receivers. Messages for multiple receivers are concatenated by the transmission system and are sent sequentially by the transmitter. Each receiver inspects the arriving messages to determine if a message is intended for that receiver. As a consequence of the single transmission point, there is no potential contention for the RF (radio frequency) channel resource. However, in a two-way paging system, or a system which allows only "inbound" messaging (mobile to base transmission), mobile units wanting to use the system must request service on a shared RF channel commonly referred to as the acquisition channel. If system resources are available, the mobile unit may be assigned to a dedicated channel for further communications, or may utilize bandwidth within the acquisition channel to send a brief digital message. If system resources are not available, the request will be denied. In this manner, the acquisition channel must be utilized to determine if system resources are available. Thus, the acquisition channel within such a system is extremely valuable because it is a shared resource.

In two-way paging systems and other wireless communications systems, bandwidth is a valuable limited resource. In a conventional wireless system, only a portion of the bandwidth is allocated for mobile units to access the system. If a mobile unit cannot achieve access because the acquisition channels are congested, no service can be delivered even if plentiful traffic bandwidth is available. Thus, it is critical to control when mobile units consume the acquisition resource. Accordingly, there exists a need for a system for controlling network bandwidth and acquisition thereto.

BRIEF DESCRIPTION OF THE DRAWING

The sole FIGURE shows a diagram of two-way paging system in accordance with a preferred embodiment of the present invention.

DETAILED DESCRIPTION OF THE PREFERRED EMBODIMENT

Today's paging systems are just beginning to support the delivery of short messages from a mobile unit to a base station (e.g., a gateway). This delivery can be transmitted from the mobile unit through a satellite constellation to the base station, or may occur using terrestrial receiving resources. The transmission of a paging message from a mobile unit further increases the demand on available network bandwidth by requiring a significant portion of the acquisition resources, while using almost no traffic bandwidth. In the invention, a mobile origination unit only requests system resources when appropriate acquisition resources are available. The invention also more evenly distributes the usage of the acquisition resources across many mobile units thereby avoiding potential large spikes and network congestion.

In general, the invention applies to any system that collects short digital messages from multiple mobile units and concentrates the traffic to or through a single point. In this case, the invention can be applied to limit the opportunities for mobile units to transmit messages toward the concentration point such that the collecting system is not congested by excessive attempts. In periods of high traffic, fewer opportunities are offered to the mobiles. This technique can be applied to the "inbound" paging channel in a two-way paging system, but can also be utilized in a one-way transmission architecture. One of the key points of the invention is that a system having multiple, independent transmitters and a single receiving point can benefit from this invention. The invention allows the receiving point to throttle the traffic generated by the multiple transmitters such that the capacity of the receiver is not overwhelmed.

A "satellite" as used throughout this description means a manmade object or vehicle intended to orbit the earth. A "satellite" comprises geostationary satellites, or satellites orbiting the earth at low-earth or medium-earth altitudes and/or combinations thereof. A "constellation" means a number of satellites arranged in orbits for providing specified coverage (e.g., radio communication, remote sensing, etc.) of a portion, portions or all of the earth. A constellation typically includes multiple rings (or planes) of satellites and may have an equal number of satellites in each plane, although this is not essential.

The sole FIGURE shows a diagram of communication system which may support both voice and digital communication in accordance with a preferred embodiment of the present invention. Although the sole FIGURE illustrates a highly simplified diagram of communication system 10, system 10 comprises at least one satellite 20, any number of mobile units 30 and base station 40. Generally, communication system 10 may be viewed as a network of nodes. All nodes of communication system 10 are or may be in data communication with other nodes of communication system 10 through communication links. In addition, all nodes of communication system 10 are or may be in data communication with other telephonic devices dispersed throughout the world through public switched telephone networks (PSTNs) and/or conventional terrestrial communication devices coupled to a PSTN through conventional terrestrial base stations.

The preferred embodiment of the present invention is applicable to space-based communication systems that assign particular regions on the earth to specific cells on the earth, and preferably to systems that move cells across the surface of the earth. Although the present invention is applicable to space-based communication systems 10 having at least one satellite 20 in low-earth, medium-earth or geosynchronous orbit, satellite 20 is preferably in low-earth orbit around earth. Satellite 20 may be a single satellite or one of many satellites in a constellation of satellites orbiting earth. The present invention is also applicable to space-based communication systems 10 having satellites 20 which orbit earth at any angle of inclination including polar, equatorial, inclined or other orbital patterns. The present invention is applicable to systems 10 where full coverage of the earth is not achieved (i.e., where there are "holes" in the communication coverage provided by the constellation) and to systems 10 where plural coverage of portions of the earth occur (i.e., more than one satellite is in view of a particular point on the earth's surface).

Each satellite 20 communicates with other adjacent satellites 20 through cross-links in the preferred embodiment of the present invention. These cross-links form a backbone of space-based mobile communication system 10. Thus, a call or communication from one subscriber unit located at any point on or near the surface of the earth may be routed through a satellite or a constellation of satellites to within range of substantially any other point on the surface of the earth. A communication may be routed down to a mobile unit (which is receiving the call) on or near the surface of the earth from another satellite 20. How satellite 20 physically communicates with mobile units 30 and base station 40 is well known to those of ordinary skill in the art.

Mobile units 30 may be located anywhere on the surface of earth or in the atmosphere above earth. communication system 10 may accommodate any number of mobile units 30. Mobile units 30 are preferably communication devices capable of receiving pages. The pages can be alphanumeric, numeric or any other known or future paging data or information. By way of example, mobile units 30 may be a hand-held, mobile satellite cellular pager adapted to transmit to and receive transmissions from satellites 20 and/or base stations 40. Moreover, mobile units 30 do not have to be mobile in the traditional sense, but can be fixed in one location for an extended period of time.

How mobile units 30 physically transmit data to and receive data from satellites 20 is well known to those of ordinary skill in the art. In the preferred embodiment of the present invention, mobile units 30 communicate with satellite 20 using a limited portion of the electromagnetic spectrum that is divided into numerous channels. The channels are preferably combinations of L-Band, K-Band and/or S-band frequency channels but may encompass Frequency Division Multiple Access (FDMA) and/or Time Division Multiple Access (TDMA) and/or Code Division Multiple Access (CDMA) communication or any other combination thereof. Other methods can be used as is known to those of ordinary skill in the art.

Base station 40 communicates with and may control satellite 20. There may be multiple base stations 40 located at different regions on the earth. For example, there may be one base station 40 located in Honolulu, another located in Los Angeles and another in Washington, D.C. Another example is to have separate base stations 40 located in each country on the earth. Base stations 40 may provide satellite control commands to satellite 20 so that satellite 20 maintains its proper position in its orbit and performs other essential housekeeping tasks. Base station 40 may be additionally responsible for receiving paging data or information from satellite 20. How base station 40 physically communicate with satellites 20 and/or mobile units 30 is well known to those of ordinary skill in the art.

A service with a potentially huge market, referred to as Short Burst Message Service (SBMS) facilitates in-bound (mobile unit to base station) delivery of limited length digital data packets. This service generates short bursts of traffic from a mobile unit (or a message origination device) to a base station, where they are distributed appropriately. The small amount of total traffic generated by these short bursts is not substantial except that each mobile unit's access and transfer attempt provides additional load to the already crowded acquisition channel.

In the preferred embodiment of the invention, system 10 via satellite 20 informs mobile units 30 when network bandwidth is available and/or acquisition is allowed for mobile originated short burst service. System 10 via base station 40 or satellite 20 monitors the available network bandwidth and acquisition resources and determines when it is available for use. In the preferred embodiment, satellite 20 controls the acquisition resources available for use in the region currently covered by cells projected by satellite 20. Satellite 20, based on current traffic load through satellite 20, determines the ability of satellite 20 to support increased acquisition attempts. Satellite 20, potentially in concert with system 10, preferably controls when mobile units 30 can use SBMS based on a this real-time loading analysis, or in alternative embodiment, on a periodic basis.

System 10 or satellite 20 transmits acquisition channel resource information to mobile units 30 that signals when mobile units 30 are permitted to access, obtain and use the acquisition channel. The acquisition channel resource information comprises one or more bits specifically reserved in the broadcast channel and may be referred as an acquisition code. Although using the broadcast channel is preferred, it is not essential and other channels could be used as well. In a preferred embodiment, multiple acquisition codes are evenly distibuted throughout mobile units 30 such that only a fraction of mobile units 30 will have equivalent codes. When an acquisition code within the broadcast channel resource information is enabled or set, mobile units 30 that have matching acquisition codes are permitted to transmit their acquisition requests and subsequently transmit messages in short bursts (i.e., SBMS). When the broadcast acquisition code is disabled, changed, or cleared, said mobile units 30 cannot transmit any message, including acquisition requests.

In the preferred embodiment, a single acquisition bit is used to enable or disable mobile units 30 ability to access the acquisition channel based on available resources or based on a predetermined time period (e.g., periodically). In an alternate embodiment, a plurality of acquisition bits are used to assign mobile units 30 to specific groups. System 10, via satellite 20, enables or disables groups of mobile units 30 by enabling/disabling the acquisition code which informs each group that they are permitted to access the acquisition channel, obtain a traffic channel and transmit their messages across an acquired traffic channel. Group assignment can use more than one bit to support groups or priority classes of users (e.g., search and rescue class users have a higher priority over other types or classes of users). Although bits can be used to identify specific groups, there are other ways to identify groups of mobile units that are known to those of ordinary skill in the art.

The invention thus combines the need to decrease acquisition attempts on a crowded acquisition channel in a short burst two-way paging system using the broadcast channel to inform mobile units or resource availability. One of the many advantages of the invention is that system 10 alleviates loading the acquisition channel with SBMS requests when resources are not available. Another advantage of the invention is that mobile units are informed when resources are available to support an additional revenue bearing service.

Although the preferred embodiments of the invention have been illustrated and described in detail, it will be readily apparent to those skilled in the art that various modifications may be made therein without departing from the spirit of the invention or from the scope of the appended claims.

What is claimed is:

1. A communication system for distributing usage of an acquisition channel of a single traffic concentration point receiving inbound traffic from a plurality of mobile units, comprising:

a first group of the plurality of mobile units, each of said first group enabled to request service on the acquisition channel upon receipt of a first acquisition code;

a second group of the plurality of mobile units, each of said second group enabled to request service on the acquisition channel upon receipt of a second acquisition code; and a satellite operating as the single concentration point and receiving inbound traffic from said first group and said second group of the plurality of mobile units, said satellite utilizing a broadcast channel to broadcast said first acquisition code for a first period of time and said satellite utilizing said broadcast channel to broadcast said second acquisition code for a second period of time such that one of said first group and said second group is enabled to request service on the acquisition channel and each one of the plurality of mobile units of said first group and second group that is enabled to request service on the acquisition channel is enabled to independently seek communication resources of said satellite, thereby limiting the plurality of mobile units enabled to request service on the acquisition channel and distributing the usage of the acquisition channel of the single concentration point.

2. A communication system recited in claim 1, further comprising a plurality of satellites operating as a plurality of single concentration points receiving inbound traffic from the plurality of mobile units, each of said plurality of satellites utilizing said broadcast channel to broadcast said first acquisition code for a first period of time and each of said plurality of satellites utilizing said broadcast channel to broadcast said second acquisition code for a second period of time such that one of said first group and said second group is enabled to request service on the acquisition channel of each of said plurality of single concentration points.

3. A communication system as recited in claim 2, wherein each of the plurality of satellites are in low-earth orbit around earth.

4. A communication system as recited in claim 2, wherein each of the plurality of satellites are in medium-earth orbit around earth.

5. A communication system as recited in claim 2, wherein each of the plurality of satellites are in one of low-earth orbit satellite, medium-earth orbit satellite or geosynchronous satellite.

6. A communication system as recited in claim 1, wherein each of the first group of the plurality of mobile units can transmit a message to a base station utilizing the acquisition channel when the first group of the plurality of mobile units is enabled to request service on the acquisition channel.

7. A communication system as recited in claim 1, further comprising a third group of the plurality of mobile units, said third group enabled to request service on the acquisition channel upon receipt of a third acquisition code; and
said satellite utilizing said broadcast channel to broadcast said third acquisition code for a third period of time such that said third group is enabled to request service on the acquisition channel other than during said first period of time and said second period of time.

8. A communication system as recited in claim 1, wherein said first group has a higher priority to request service on the acquisition channel over said second group.

9. A communication system as recited in claim 1, wherein said first acquisition code and said second acquisition code are assigned to said first group and said second group based upon a priority class of users.

10. A communication system as recited in claim 1, wherein said first group of the plurality of mobile units provides a Short Burst Message Service (SBMS).

11. A method for distributing usage of an acquisition channel of a single traffic concentration point receiving inbound traffic from a plurality of mobile units, the method comprising:
forming a first group of the plurality of mobile units;
enabling each of said first group to request service on the acquisition channel upon receipt of a first acquisition code;
forming a second group of the plurality of mobile units;
enabling each of said second group to request service on the acquisition channel upon receipt of a second acquisition code;
operating a satellite as the single concentration point receiving inbound traffic from said first group and said second group of the plurality of mobile units;
utilizing a broadcast channel of said satellite to broadcast said first acquisition code for a first period of time; and
utilizing said broadcast channel of said satellite to broadcast said second acquisition code for a second period of time such that one of said first group and said second group of the plurality of mobile units is enabled to request service on the acquisition channel and each one of the plurality of mobile units of said first group and second group that is enabled to request service on the acquisition channel is enabled to independently seek communication resources of said satellite, thereby limiting the plurality of mobile units enabled to to request service on the acquisition channel and distributing the usage of the acquisition channel of the single concentration point.

12. A method for distributing usage of an acquisition channel as recited in claim 11, the method further comprising:
(h) operating a plurality of satellites as a plurality of single concentration points receiving inbound traffic from the plurality of mobile units;
(i) utilizing said broadcast channel to broadcast said first acquisition code with said plurality of satellites for a first period of time; and
(j) utilizing said broadcast channel to broadcast said second acquisition code with said plurality of satellites for a second period of time such that one of said first group and said second group of the plurality of mobile units is enabled to request service on the acquisition channel.

13. A method for distributing usage of an acquisition channel as recited in claim 11, the method further comprising:
(h) forming a third group of the plurality of mobile units;
(i) enabling said third group to request service on the acquisition channel upon receipt of a third acquisition code; and
(j) utilizing said broadcast channel of said satellite to broadcast said third acquisition code for a third period of time such that said third group is enabled to request service on the acquisition channel other than during said first period of time and said second period of time.

14. A method for distributing usage of an acquisition channel as recited in claim 11, the method further comprising giving said first group of the plurality of mobile units a higher priority to request service on the acquisition channel over said second group.

15. A method for distributing usage of an acquisition channel as recited in claim 11, the method further comprising assigning said first acquisition code and said second acquisition code to said first group and said second group of the plurality of mobile units based upon a priority class of users.

16. A method for distributing usage of an acquisition channel as recited in claim 11, the method further comprising providing a Short Burst Message Service (SBMS) with said first group of the plurality of mobile units.

* * * * *